United States Patent
Jakubik

(10) Patent No.: US 9,015,160 B2
(45) Date of Patent: Apr. 21, 2015

(54) MULTI-CONCEPT LATENT SEMANTIC ANALYSIS QUERIES

(75) Inventor: Paul A. Jakubik, Plano, TX (US)

(73) Assignee: Brainspace Corporation, Dallas, TX (US)

( * ) Notice: Subject to any disclaimer, the term of this patent is extended or adjusted under 35 U.S.C. 154(b) by 0 days.

(21) Appl. No.: 13/326,284

(22) Filed: Dec. 14, 2011

(65) Prior Publication Data

US 2013/0159313 A1     Jun. 20, 2013

(51) Int. Cl.
*G06F 17/30* (2006.01)

(52) U.S. Cl.
CPC .... *G06F 17/30705* (2013.01); *G06F 17/30713* (2013.01); *G06F 17/3071* (2013.01)

(58) Field of Classification Search
CPC .......... G06F 17/30705; G06F 17/3071; G06F 17/30713
USPC .................................. 707/737, 739, 748, 750
See application file for complete search history.

(56) References Cited

U.S. PATENT DOCUMENTS

| | | | | |
|---|---|---|---|---|
| 5,325,298 | A * | 6/1994 | Gallant | 704/9 |
| 6,701,305 | B1 * | 3/2004 | Holt et al. | 706/45 |
| 6,724,940 | B1 * | 4/2004 | Qian et al. | 382/253 |
| 6,847,966 | B1 * | 1/2005 | Sommer et al. | 707/739 |
| 7,797,265 | B2 * | 9/2010 | Brinker et al. | 706/45 |
| 2003/0069909 | A1 * | 4/2003 | Bellegarda | 707/513 |
| 2005/0010555 | A1 * | 1/2005 | Gallivan | 707/2 |
| 2005/0015366 | A1 * | 1/2005 | Carrasco et al. | 707/3 |
| 2005/0055341 | A1 * | 3/2005 | Haahr et al. | 707/3 |
| 2006/0089947 | A1 * | 4/2006 | Gallivan et al. | 707/102 |
| 2006/0259481 | A1 * | 11/2006 | Handley | 707/5 |
| 2010/0161592 | A1 * | 6/2010 | Zhao | 707/722 |
| 2010/0262454 | A1 * | 10/2010 | Sommer et al. | 705/10 |
| 2013/0218554 | A1 | 8/2013 | Jakubik | |

OTHER PUBLICATIONS

Office Action Summary for U.S. Appl. No. 13/732,869, filed Jan. 2, 2013, Dec. 5, 2013.
Response to Office Action dated Jun. 28, 2013 for U.S. Appl. No. 13/732,869, Sep. 30, 2013.
Office Action Summary for U.S. Appl. No. 13/732,869, filed Jan. 2, 2013, Jun. 28, 2013.
Response to Notice to File Corrected Application Papers for U.S. Appl. No. 13/732,869, May 6, 2013.

(Continued)

*Primary Examiner* — Neveen Abel Jalil
*Assistant Examiner* — Kristofer Biskeborn
(74) *Attorney, Agent, or Firm* — Baker Botts L.L.P.

(57) ABSTRACT

A method includes accessing text, identifying a plurality of terms from the text, determining a plurality of term vectors associated with the identified plurality of terms, and clustering the determined plurality of term vectors into a plurality of clusters, the plurality of clusters comprising a first and a second cluster, the first and second clusters each comprising two or more of the determined term vectors. The method further includes creating a first pseudo-document according to the first cluster, creating a second pseudo-document according to the second cluster, identifying a first set of terms associated with the first cluster using latent semantic analysis (LSA) of the first pseudo-document, identifying a second set of terms associated with the second cluster using LSA of the second pseudo-document, and combining the first and second sets of terms into a list of output terms.

20 Claims, 3 Drawing Sheets

(56) References Cited

OTHER PUBLICATIONS

Notice to File Corrected Application Papers for U.S. Appl. No. 13/732,869, Feb. 5, 2013.
Fasulo, Daniel, "An Analysis of Recent Work on Clustering Algorithms" Apr. 26, 1999.
Request for Continued Examination for U.S. Appl. No. 13/732,869, Mar. 5, 2014.
Office Action Summary for U.S. Appl. No. 13/732,869, filed Jan. 2, 2013, Jul. 17, 2014.
Response Pursuant to 37 C.F.R. 1.111 for U.S. Appl. No. 13/732,869, filed Jan. 2, 2013, Oct. 17, 2014.
Applicant Initiated Interview Summary for U.S. Appl. No. 13/732,869, filed Jan. 2, 2013, Oct. 21, 2014.

* cited by examiner

MULTI-CONCEPT LATENT SEMANTIC ANALYSIS QUERIES

TECHNICAL FIELD

This disclosure relates in general to searching of data and more particularly to multi-concept latent semantic analysis queries.

BACKGROUND

Latent Semantic Analysis ("LSA") is a modern algorithm that is used in many applications for discovering latent relationships in data. In one such application, LSA is used in the analysis and searching of text documents. Given a set of two or more documents, LSA provides a way to mathematically determine which documents are related to each other, which terms in the documents are related to each other, and how the documents and terms are related to a query. Additionally, LSA may also be used to determine relationships between the documents and a term even if the term does not appear in the document.

LSA utilizes Singular Value Decomposition ("SVD") to determine relationships in the input data. Given an input matrix representative of the input data, SVD is used to decompose the input matrix into three decomposed matrices. LSA then creates compressed matrices by truncating vectors in the three decomposed matrices into smaller dimensions. Finally, LSA analyzes data in the compressed matrices to determine latent relationships in the input data.

SUMMARY OF THE DISCLOSURE

According to one embodiment, a method includes accessing text, identifying a plurality of terms from the text, determining a plurality of term vectors associated with the identified plurality of terms, and clustering the determined plurality of term vectors into a plurality of clusters, the plurality of clusters comprising a first and a second cluster, the first and second clusters each comprising two or more of the determined term vectors. The method further includes creating a first pseudo-document according to the first cluster, creating a second pseudo-document according to the second cluster, identifying a first set of terms associated with the first cluster using latent semantic analysis (LSA) of the first pseudo-document, identifying a second set of terms associated with the second cluster using LSA of the second pseudo-document, and combining the first and second sets of terms into a list of output terms.

Technical advantages of certain embodiments may include preserving multiple concepts from text. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

A standard Latent Semantic Analysis ("LSA") process is capable of accepting and analyzing text such as word, a paragraph of text, or a document. Once the text is received, the LSA process typically creates a pseudo-document vector for the input text and then uses that vector to probe an LSA term space. The LSA process, as a result of probing the LSA term space, produces a list of terms and phrases related to the text that may be used to search a keyword index to find related documents. Standard LSA processes, however, may sometimes overlook key concepts by focusing on only one concept of the text.

The teachings of the disclosure recognize that it would be desirable to utilize an enhanced LSA process that preserves multiple concepts from text. The following describes a system and method of providing multi-concept latent semantic analysis queries.

Figure 1:
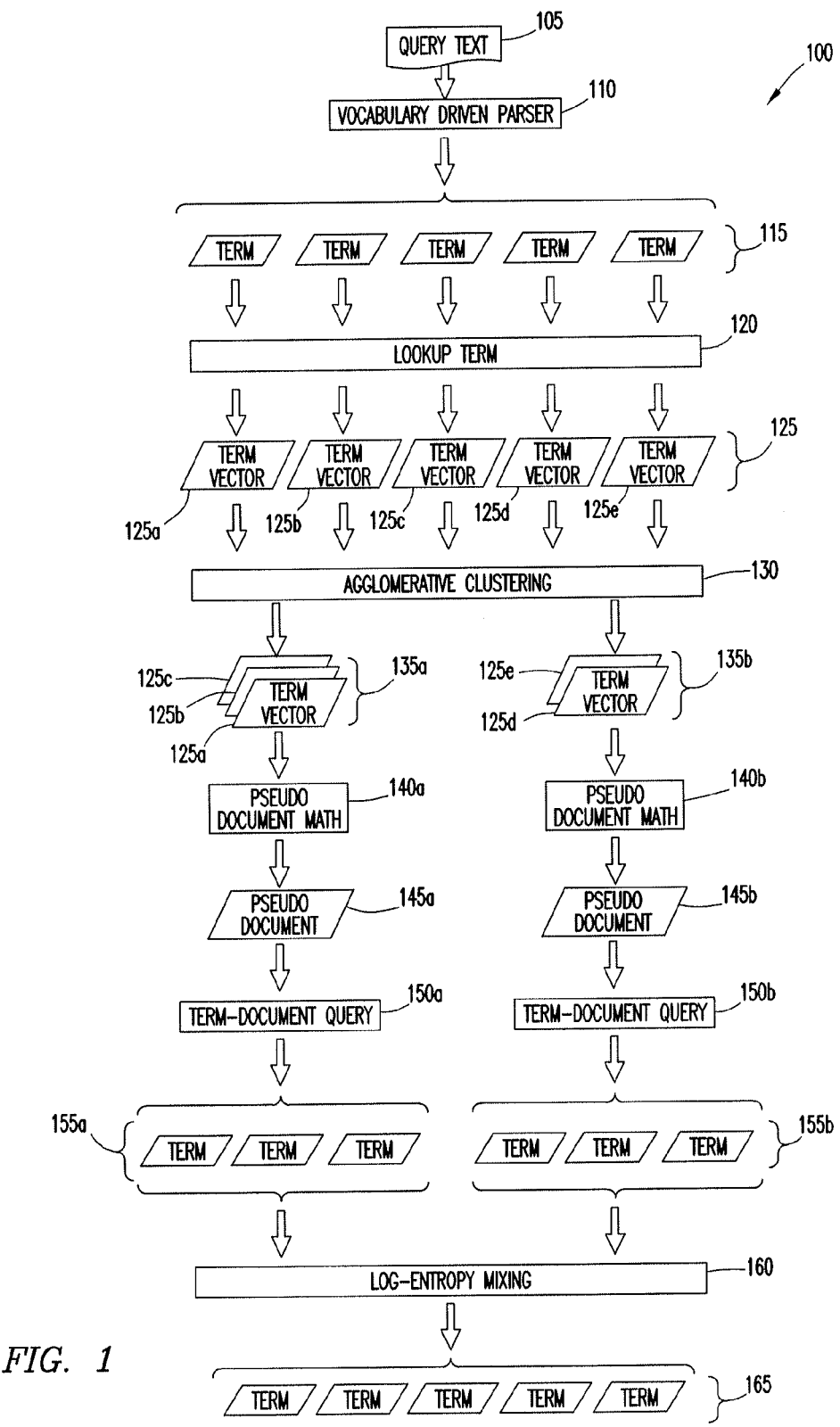
FIG. 1 is a chart depicting a method 100 for preserving multiple concepts from text when querying an LSA space, according to certain embodiments.

FIG. 1 is a chart depicting a method 100 for preserving multiple concepts from text when querying an LSA space. Method 100 provides multi-concept queries using a single LSA space. At a high level, the multi-concept query algorithm of method 100 can be described as the following: 1.) identify distinct concepts in the query; 2.) create as many pseudo-documents as necessary to avoid losing any distinct concepts; 3.) probe the LSA term space with each pseudo-document; and 4.) combine the query results into a single result list. To perform multi-concept LSA queries, the primary idea is to identify distinct concepts, create at least as many separate pseudo-documents as needed to preserve the distinct concepts, perform separate queries on the LSA term space to get terms for each distinct concept, and combine those separate results into a single result list. More details about LSA may be found in U.S. patent application Ser. No. 12/263,169 ("System and Method for Discovering Latent Relationships in Data") which is incorporated herein by reference.

Method 100 begins in step 110 where text 105 is received and/or accessed by vocabulary driven parser 110. Text 105 may be any text such as a word, a group of words (i.e., a sentence or a paragraph), a document, and the like. In certain embodiments, text 105 may refer to query text. Vocabulary driven parser 110 indentifies terms 115 from text 105. Vocabulary driven parser 110 ensures that only terms that appear in the LSA term space are counted. In certain embodiments, vocabulary driven parser 110 utilizes a greedy algorithm to identify the largest phrases in text 105 that are also in the LSA term space. In certain embodiments, ties are resolved by first selecting terms that have the highest weight in the LSA term space vocabulary.

In step 120, term vectors 125 that are associated with terms 115 are identified from the LSA term space. Term vectors 125 contain all of the terms 115 and/or phrases found in text 105 and the number of occasions the terms 115 and/or phrases appear in the text 105.

In step 130, the term vectors 125 identified in step 120 are formed into clusters 135 for each term 115 in text 105. Step 130 is one place that method 100 differs from a standard LSA query. In some embodiments, agglomerative clustering is utilized in step 130 to group term vectors 125 into adequately tight clusters 135. In the illustrated embodiment, for example, term vectors 125a-125c are grouped into cluster 135a, while term vectors 125e-125d are grouped into cluster 135b. Overall, term vectors 125 are clustered together using any appropriate clustering technique to determine whether terms 115 are related close enough to be considered a single concept. In some embodiments, term vectors 125 are clustered together using any appropriate clustering process including, but not limited to, agglomerative clustering, top-down clustering, k-means clustering (i.e., iterative k-means++), and the like. For example, step 130 may determine the n (where n is any predetermined integer) closest term vectors 125 (i.e., as determined by their log-entropy score) and then cluster these term vectors 125 together. This process may be repeated until either all of term vectors 125 have been clustered or until a predetermined number of clusters 135 have been created.

In certain embodiments, the importance of each term vector 125 may first be determined and then used to determine whether to cluster one term vector 125 with another term vector 125. For example, step 130 may first calculate the mean log-entropy weight for each term vector 125. Next, the standard deviation for the log-entropy weights of term vectors 125 is calculated. Next, any term vectors 125 with a log-entropy weight greater than a certain predetermined standard deviation more than the mean log-entropy weight (i.e., more than 0.8 standard deviations more than the mean log-entropy weight) is considered to be an important term vector. Additionally, some embodiments consider term vectors 125 to be unimportant if the entropy of the term 115 is more than a certain amount (i.e., 0.4) of standard deviations lower than the mean entropy for the terms 115 in the query. Otherwise, if a term 115 of a term vectors 125 is neither an important term nor an unimportant term, it may be considered a neutral term. In certain embodiments, unimportant terms 115 are thrown out and are not used for querying. Step 130 may then combine important term vectors 125 together to form a cluster 135.

In certain embodiments, step 130 may prevent unimportant term vectors 125 from being clustered with important term vectors 125. Some embodiments utilize a stricter rule for which terms 115 can be clustered with an important term 115. For example, if a term 115 is important, a much smaller maximum distance to other terms 115 in the cluster 135 is used, while clusters 135 that only contain neutral and unimportant terms 115 are more lenient about which terms 115 can be added to the cluster 135. Overall, the main goal is that the most meaningful terms 115 should be kept meaningful by only clustering them with very similar terms 115, while it is okay for less meaningful terms 115 (i.e., neutral or unimportant terms 115) to have their meaning diluted by being put in a looser cluster 135. In certain embodiments, step 130 may insert the created cluster 135 back into the group of term vectors 125 and then perform the above calculations again to find the next closest term vectors 125.

Figure 2:
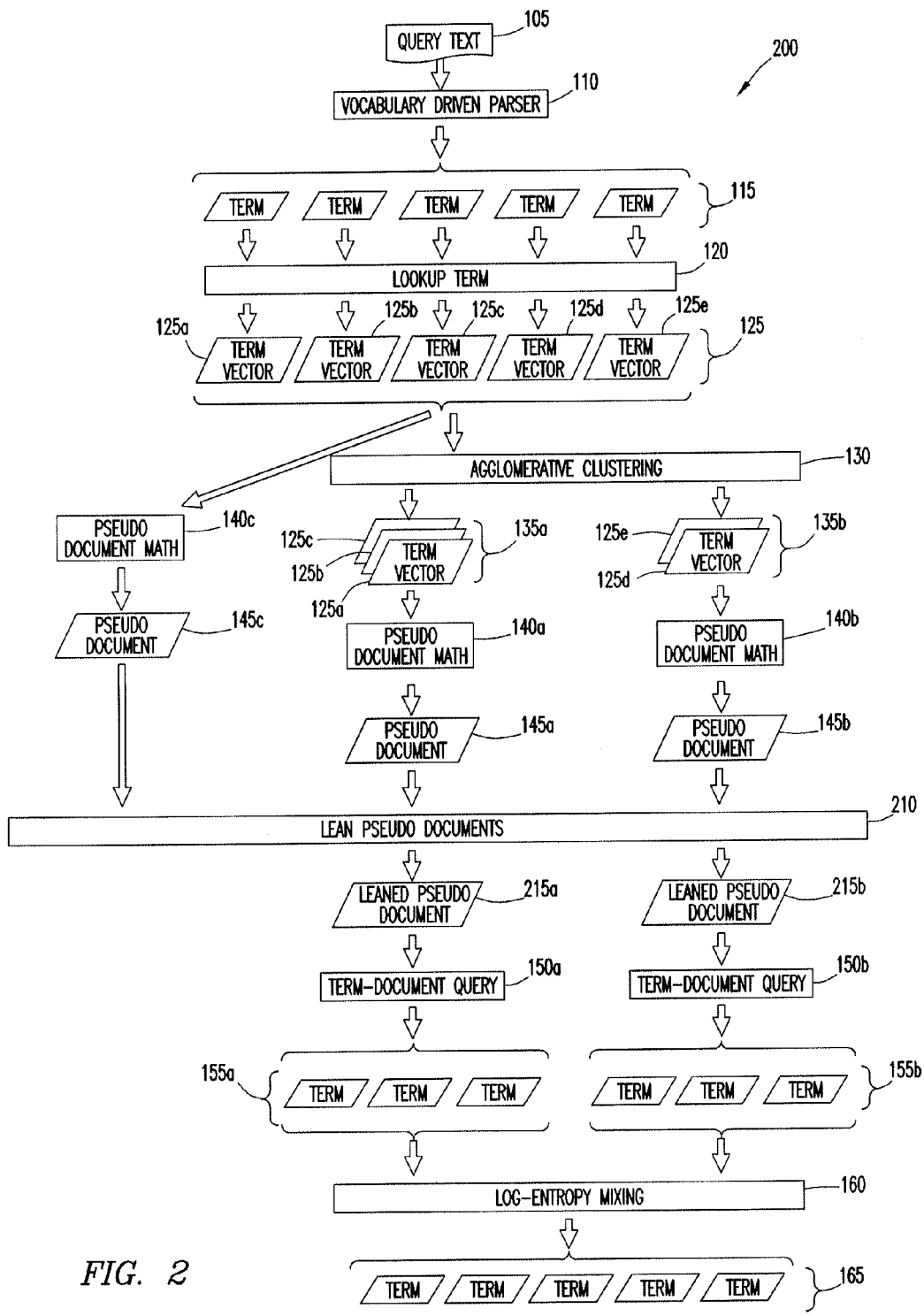
FIG. 2 is a chart depicting another method 200 for preserving multiple concepts from text when querying an LSA space, according to certain embodiments.

While the embodiment of method 100 illustrated in FIG. 2 depicts two clusters 135 (e.g., cluster 135a and 135b), it should be understood than any number of clusters 135 may be created. In certain embodiments, the number of clusters 135 created depends on one or more of the following factors:

How many terms 115 are in text 105
How many important terms 115 are in text 105
How closely related terms 115 are
How closely related the important terms 115 are
How many result terms have been requested from a user After term vectors 125 are grouped into clusters 135 in step 130, the clusters 135 are each separately passed to pseudo document math step 140. In pseudo document math step 140, clusters 135 are processed using singular value decomposition (SVD) and a separate pseudo document 145 is created for each cluster 135 identified in step 130. For example, cluster 135a which includes term vectors 125a-125c is processed in pseudo document math step 140a to produce pseudo document 145a. Likewise, cluster 135b that includes term vectors 125d-125e is processed in pseudo document math step 140b to produce pseudo document 145b.

In step 150, a term-document query is performed on the LSA space using pseudo document 145 in order to determine pseudo document terms 155. For example, a term-document query 150a is performed on the LSA space using pseudo document 145a in order to determine pseudo document terms 155a. Likewise, a term-document query 150b is performed on the LSA space using pseudo document 145b in order to determine pseudo document terms 155b.

In step 160, the pseudo document terms 155 determined in steps 150a and 150b are mixed into a single list. In certain embodiments, the pseudo document terms 155 determined in steps 150a and 150b are weighted in order to determine how many terms should be used from each query result. In certain embodiments, a total log-entropy weight of pseudo document terms 155 in each pseudo document 145 is used to determine how many terms should be used from each query result. For example, clusters 135 having larger log-entropy weights may contribute more terms to the final list of terms. As an example for illustrative purposes only, consider the example where the log-entropy weights of term vectors 125 are as follows:

term vector 125a: 10
term vector 125b: 15
term vector 125c: 15
term vector 125d: 30
term vector 125e: 30

In this example, cluster 135a, which includes term vectors 125a-125c, would have a total log-entropy weight of 40 (10+15+15). Likewise, cluster 135b, which includes term vectors 125d-125e, would have a total log-entropy weight of 60 (30+30). In certain embodiments, the log-entropy weights of all clusters 135 may be summed and then a fraction of each cluster's contribution to the summed log-entropy weight may be determined. In this example, the summed log-entropy weight would be 100 (40+60), the fraction of cluster 135a's contribution would be 0.4 or 40% (40/100), and the fraction of cluster 135b's contribution would be 0.6 or 60% (60/100). As a result, it may be determined in step 160 that 40% of list of terms 165 should be from cluster 135a and 60% of list of terms 165 should be from cluster 135b. Thus, if list of terms 165 is five terms (i.e., there is a predetermined limit of five terms for list of terms 165), two would come from cluster 135a and three would come cluster 135b.

In certain embodiments, the log-entropy weights of term vectors 125 may be scaled based on whether the term vector 125 is considered to be an important or unimportant term vector as described above. For example, if a particular term vector 125 is determined to be an important term vector (i.e., based on its log-entropy weight as compared to the standard deviation of the log-entropy weights of term vectors 125 as described above), its log-entropy weight may be scaled by N times (i.e., multiplied by a number such as three).

After determining how many terms should be used from each query result, a single list of output terms 165 is determined. List of output terms 165 is a combination of the results from the separate LSA queries according to a query recipe determined in step 160.

In certain embodiments, method 100 performs a query using list of terms 165. In some embodiments, this may include submitting list of terms 165 to a query engine (i.e., an online query engine such as GOOGLE, YAHOO, and the like). In certain embodiments, a user can change the recipe to include more of some concept clusters 135, and less of others in list of terms 165. This may include completely removing certain concept clusters 135 and/or adding in other concept clusters 135 that were generated in separate queries. In certain embodiments, a user may be presented with clusters 135 (i.e., on a graphical display) so that the user may select which clusters 135 to include in list of terms 165.

As an example for illustrative purposes only, consider the following paragraph as text 105:

Java (Indonesian: Jawa) is an island of Indonesia and the site of its capital city, Jakarta. Once the centre of powerful Hindu-Buddhist kingdoms, Islamic sultanates, and the core of the colonial Dutch East Indies, Java now plays a dominant role in the economic and political life of Indonesia. Java is also one of the most densely populated regions on Earth.

This paragraph is about the island Java which is part of Indonesia. The paragraph touches on the geography, history, and political significance of Java. Using the standard LSA technique of creating a pseudo-document vector for this paragraph, and then using that vector to probe an LSA term space, the following may be the list of terms that would be determined and subsequently used in a query:

malay kingdoms
majapahit empire
indonesian archipelago
yogyakarta
javanese
indonesian history
indonesians
johor-riau
minangkabau
modern-day indonesia
majapahit
bugis
eastern java
malay archipelago
sumatra and kalimantan
malay world
agung
sumatra
java and sumatra While these terms may capture Java as a geographic entity, the history is only suggested through phrases like "Malay Kingdoms" and "Indonesian History." Specifics about Java's Hindu-Buddhist, Islamic, and Dutch colonial history are missing from these terms. If it was desired to only search the same documents that were used to train the LSA space, these terms may be adequate. However, if it is desired to search other sets of documents that were not used to train the LSA space, including internet scale indexes like GOOGLE and YAHOO, these terms are missing important concepts. Using the techniques for multi-concept LSA queries of method 100 discussed above, the following list of output terms 165 may be determined (words or phrases underlined below are new):

hindu-buddhist
colonial dutch east indies
islamic sultanates
java
populated regions
upheavals
jakarta
local elites
sumatra
political centers
yogyakarta
malay world
indonesians
minangkabau
educated elite
new capital
established kingdoms
javanese
majapahit empire
indonesian archipelago This list mixes historical and political terms related to Java along with many of the geographic terms in the first list, and better covers the full breadth of the paragraph in text 105. The terms referring to Java's history include "Hindu-Buddhist", "Colonial Dutch East Indies", and "Islamic Sultanates."

Method 100 above identifies separate concepts in text 105 and ensures that list of output terms 165 will have the separate concepts. In some instances, however, the overall sense of the query may still be lost. For example, consider the following text 105:

Java (Indonesian: Jawa) is an island of Indonesia and the site of its capital city, Jakarta. Once the centre of powerful Hindu-Buddhist kingdoms, Islamic sultanates, and the core of the colonial Dutch East Indies, Java now plays a dominant role in the economic and political life of Indonesia. Java is also one of the most densely populated regions on Earth.

Using a general knowledge LSA space the following clusters may be determined for this text 105:

Dominant role, political life, densely, kingdoms, capital city, core
Jawa, Indonesia, Jakarta, Indonesian
Populated regions
Hindu-Buddhist
Islamic sultanates
Colonial Dutch East Indies
Java Notice "Java" is in a cluster by itself instead of being clustered with "Jawa," "Indonesia," "Jakarta," and "Indonesian." To understand why, imagine that the general knowledge LSA space was created from documents taken from the internet. While there are many articles that talk about the island Java, there is over an order of magnitude more articles that talk about the programming language Java. Since there are more than ten times the articles talking about Java as a programming language instead of Java as an island, the term "Java" winds up in a portion of the LSA space dedicated to programming, and is a long way from the concept of the island named "Java." This causes two problems: Java ends up in a cluster by itself, and Java produces terms that are all about programming, and not about an island. Querying the LSA space for only "java" provides the following top 20 results:

java
java platform
java api
java implementation
jdk
java application
java se
jvm
java language
java developers
java development kit
java virtual machine
java servlet
jython
java objects
java libraries
jre jsr
java classes
java versions None of these terms, aside from Java itself, have anything to do with the Java Island. While the LSA space contains plenty of concepts at the intersection of "Java" and "island", the challenge is how to get to those terms given the starting paragraph of text 105. To balance getting terms related to Java with getting terms that are related to the overall query, method 200 described below may utilize two different techniques to lean the results towards the overall meaning of the query.

FIG. 2 is a chart depicting another method 200 for preserving multiple concepts from text when querying an LSA space. Method 200 is similar to method 100 but additionally leans the results towards the overall meaning of the query. One technique utilized by method 200 to lean the results towards the overall meaning of the query is to use the results of a cluster query that are closest to the overall query are used. As described in more detail below, certain embodiments of method 200 identify the N best terms for the query made from the terms in a single cluster, then re-rank these N terms based on how close they are to a query based on all terms found in the original text and use the top M terms where M<N.

Another technique additionally/alternatively utilized by method 200 to lean the results towards the overall meaning of the query is to lean the cluster query vector towards the overall query. After normalizing the cluster query vector and the overall query vector to be the same length, certain embodiments of method 200 use a query vector that points to somewhere on the line between the point that is pointed to by the normalized cluster query vector, and the point that is pointed at by the normalized overall query vector. Depending on the goal, a vector may be selected that is closer to the cluster query, closer to the overall query, or somewhere in between. In practice, if the cluster vector and overall query vector are close to each other, no leaning is necessary. Conversely, the further apart the two vectors are, the more leaning is needed.

Method 200 begins in step 110 where text 105 is received and/or accessed by vocabulary driven parser 110. Text 105 may be any text such as a word, a group of words (i.e., a sentence or a paragraph), a document, and the like. Vocabulary driven parser 110 indentifies terms 115 from text 105. Vocabulary driven parser 110 ensures that only terms that appear in the LSA term space are counted. In certain embodiments, vocabulary driven parser 110 utilizes a greedy algorithm to identify the largest phrases in text 105 that are also in the LSA term space. In certain embodiments, ties are resolved by first selecting terms that have the highest weight in the LSA term space vocabulary.

In step 120, term vectors 125 that are associated with terms 115 are identified from the LSA term space. Term vectors 125 contain all of the terms 115 and/or phrases found in text 105 and the number of occasions the terms 115 and/or phrases appear in the text 105.

In step 130, the term vectors 125 identified in step 120 are formed into clusters 135 for each term 115 in text 105. Step 130, as described above, is one place that method 100 differs from a standard LSA query. In some embodiments, agglomerative clustering is utilized in step 130 to group term vectors 125 into adequately tight clusters 135. In the illustrated embodiment, for example, term vectors 125a-125c are grouped into cluster 135a, while term vectors 125e-125d are grouped into cluster 135b. Overall, term vectors 125 are clustered together using any appropriate clustering technique to determine whether terms 115 are related close enough to be considered a single concept. In some embodiments, term vectors 125 are clustered together using any appropriate clustering process including, but not limited to, agglomerative clustering, top-down clustering, k-means clustering (i.e., iterative k-means++), and the like. For example, step 130 may determine the n (where n is any predetermined integer) closest term vectors 125 (i.e., as determined by their log-entropy score) and then cluster these term vectors 125 together. This process may be repeated until either all of term vectors 125 have been clustered or until a predetermined number of clusters 135 have been created.

After term vectors 125 are grouped into clusters 135 in step 130, the clusters 135 are each separately passed to pseudo document math step 140. In pseudo document math step 140, clusters 135 are processed using SVD and a separate pseudo document 145 is created for each cluster 135 identified in step 130. For example, cluster 135a, which includes term vectors 125a-125c, is processed in pseudo document math step 140a to produce pseudo document 145a. Likewise, cluster 135b that includes term vectors 125d-125e is processed in pseudo document math step 140b to produce pseudo document 145b.

In addition to creating pseudo document 145a and 145b from clusters 135a and 135b, method 200 also creates a query pseudo document 145c for the overall text 105. More specifically, all of term vectors 125 (e.g., term vectors 125a-125e) are processed in a pseudo document math step 140c to produce pseudo document 145c.

In step 210, each of the pseudo documents 145 created from clusters 135 (i.e., pseudo documents 145a and 145b) are leaned towards the query pseudo document 145c to create leaned pseudo documents 215 (e.g., leaned pseudo documents 215a and 215b). In certain embodiments, leaned pseudo documents 215a and 215b are created using the following equations:

$$sim_i = \cos\theta_i = \frac{\vec{c_i} \cdot \vec{q}}{|\vec{c_i}||\vec{q}|}$$

$$\vec{l_i} = lean(\vec{c_i}) = \begin{cases} \vec{c_i} + \left(\frac{1-sim_i}{2}\right)\left(\frac{|\vec{c_i}|}{|\vec{q}|}\vec{q} - \vec{c_i}\right) & sim_i < 0.8 \\ \vec{c_i} & sim_i \geq 0.8 \end{cases}$$

wherein $\vec{q}$ is a vector of query pseudo document 145c, $\vec{c}_i$ is a vector of pseudo document 145 (i.e., pseudo document 145a and 145b), and $\vec{l}_i$ is a vector of leaned pseudo documents 215 (i.e., leaned pseudo documents 215a and 215b).

In step 150, a term-document query is performed on the LSA space using leaned pseudo documents 215 in order to determine pseudo document terms 155. For example, a term-document query 150a is performed on the LSA space using leaned pseudo documents 215a in order to determine pseudo document terms 155a. Likewise, a term-document query 150b is performed on the LSA space using leaned pseudo documents 215b in order to determine pseudo document terms 155b. In certain embodiments, the M closest results to $\vec{q}$ are chosen as the candidate term result list for each leaned pseudo documents 215.

In step 160, the pseudo document terms 155 determined in steps 150a and 150b are mixed into a single list. In certain embodiments, the pseudo document terms 155 determined in steps 150a and 150b are weighted in order to determine how many terms should be used from each query result. In certain embodiments, a total log-entropy weight of pseudo document terms 155 in each pseudo document 145 is used to determine how many terms should be used from each query result. For example, clusters 135 having larger log-entropy weights may contribute more terms to the final list of terms, as described above. After determining how many terms should be used from each query result, a single list of output terms 165 is determined. List of output terms 165 is a combination of the results from the separate LSA queries according to a query recipe determined in step 160.

In certain embodiments, methods 100 and 200 may include a limit on the maximum number of clusters 135 that may be created. For example, methods 100 and 200 may limit the number of clusters 135 to a fixed, predetermined limit. In certain embodiments, methods 100 and 200 may limit the number of clusters 135 to an amount that is based on the number of terms requested by a user.

In some embodiments, methods 100 and 200 employ techniques to keep important terms out of broad clusters 135 in situations where the maximum number of clusters 135 is limited (i.e., by a predetermined limit). In these situations, the resulting concept clusters may not be as cohesive as they would have been if there was not a limit on the amount of clusters 135. This is due to the fact that putting all terms into less cohesive clusters 135 can cause the meaning of the query to be lost. To prevent important meaning from being lost, certain embodiments of methods 100 and 200 utilize a summarization technique to identify important terms in text 105. After the important terms have been identified, one or more rules are enforced that prevent important terms from being included in a non-cohesive cluster. While one or more non-cohesive clusters may still be formed, the important terms from text 105 will stay separated.

In certain embodiments, methods 100 and 200 utilize the log-entropy weights of terms 115 in text 105 to determine which terms are important. For example, if there are a certain predetermined number of terms 115 (i.e., at least four terms), methods 100 and 200 may first calculate the mean log-entropy weight for terms 115 found in text 105. Next, the standard deviation for the log-entropy weights of terms 115 is calculated. Next, any term with a log-entropy weight greater than a certain predetermined standard deviation more than the mean log-entropy weight (i.e., more than 0.8 standard deviations more than the mean log-entropy weight) is considered to be an important term. This technique uses a standard way to summarize text using log-entropy weighting to identify important terms 115. Once the important terms 115 are identified, certain embodiments of agglomerative clustering step 130 are allowed to produce more than the desired number of clusters 135 if there is no way to reduce the number of clusters 135 without putting an important term in a non-cohesive cluster.

Another problem that may be encountered when clustering terms 115 into concept clusters 135 is getting clusters 135 with very little meaning. Embodiments of methods 100 and 200 that prevent important terms from being in non-cohesive clusters can make this problem worse. One of the advantages of using entropy based query summarization is that in addition to identifying important terms 115, the same technique can be used to identify unimportant terms 115. As a result, some embodiments identify and discard unimportant terms 115. For example, certain embodiments of methods 100 and 200 first calculate the mean log-entropy weight for terms 115 found in text 105. Next, the standard deviation for the log-entropy weights of terms 115 is calculated. Some embodiments of methods 100 and 200 then consider a term 115 to be unimportant if the entropy of the term 115 is more than a certain amount (i.e., 0.4) of standard deviations lower than the mean entropy for the terms 115 in the query.

When implementing an LSA solution, one problem typically encountered is when there are more documents than can be processed in a practical amount of time with an SVD algorithm. Many typical implementations sample the document set down to a size that their SVD algorithm can handle, and then fold the other documents into their SVD results afterwards. Embodiments of the disclosure, however, produce libraries of LSA spaces instead which ensures that every document is processed as part of an SVD calculation, just not all documents in the same SVD calculation. One problem with the sampling technique that is typically used is that if the sample does not contain a particular term 115, that term 115 won't be part of the result. By creating a library of LSA spaces, this problem is avoided, but there is still a way that this vocabulary limitation can cause problems with libraries of LSA spaces. When disclosed embodiments process an LSA query, they start by first selecting an LSA space that is well suited to text 105 and then performing a multi-concept query as disclosed above. However, even though an LSA space was carefully selected for a particular text 105, there may be important terms 115 that are in the text 105 but not in the selected LSA space. Sometimes there is no single LSA space that contains all the important terms 115 from a query. When this happens, methods 100 and 200 may use the following process to add the important terms 115 back into the list of output terms 165. First, a predetermined number of the top most important terms 115 (i.e., the three most important terms 115) in text 105 are identified using log-entropy to measure which words in the query are most meaningful. Second, an appropriate LSA term space is selected to use. Third, a multi-concept query is performed with a single space. Fourth, the results are checked to determine if any of the N most important terms are missing. Fifth, for each missing term 115, an LSA space is selected that contains the missing term 115 and is a good match for text 105. Results are obtained for the missing term 115, and the results are leaned towards the entire text 105. Finally, results from the missing term queries are added to the final query results (e.g., list of output terms 165). Using this technique, missing terms 115 can be added back into the query along with missing inferred terms related to the missing term.

Figure 3:
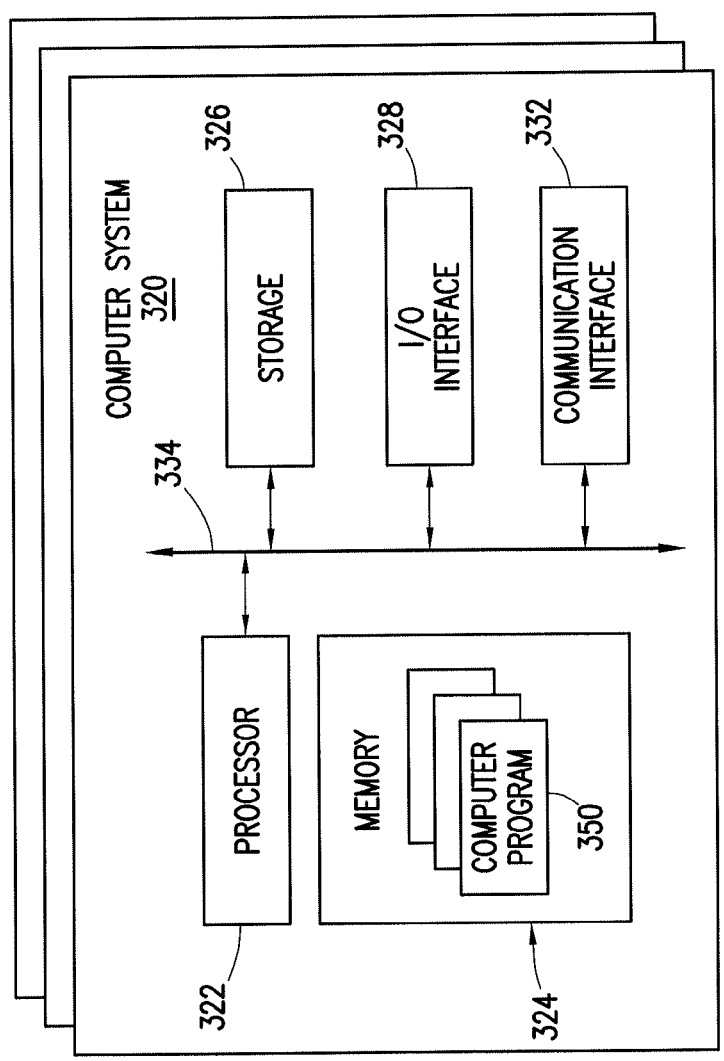
FIG. 3 is a system where particular embodiments of the disclosure may be implemented.

FIG. 3 is block diagram illustrating a portion of a processing/computing system 320 that may be used to discover latent relationships in data according to one embodiment. Computing system 320 performs one or more steps of one or more methods described or illustrated herein. In particular embodiments, one or more computing systems 320 provide functionality described or illustrated herein. In particular embodiments, software running on one or more computing systems 320 (i.e., a computer program 350) performs one or more steps of one or more methods described or illustrated herein or provides functionality described or illustrated herein. Particular embodiments include one or more portions of one or more computing systems 320.

Computing system 320 may be in any suitable physical form. As example and not by way of limitation, computing system 320 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computing system 320 may include one or more computing systems 320; be unitary or distributed; span multiple locations; span multiple machines; or reside in a cloud, which may include one or more cloud components in one or more networks. Where appropriate, one or more computing systems 320 may perform without substantial spatial or temporal limitation one or more steps of one or more methods described or illustrated herein. As an example and not by way of limitation, one or more computing systems 320 may perform in real time or in batch mode one or more steps of one or more methods described or illustrated herein. One or more computing systems 320 may perform at different times or at different locations one or more steps of one or more methods described or illustrated herein, where appropriate.

In some embodiments, computing system 320 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computing system 320 may be a web server running web server applications such as Apache, Microsoft's Internet Information Server™, and the like.

In particular embodiments, computing system 320 includes a processor 322, memory 324, storage device 326, an input/output (I/O) interface 328, a communication interface 332, and a bus 334. Although this disclosure describes and illustrates a particular computing system 320 having a particular number of particular components in a particular arrangement, this disclosure contemplates any suitable computing system 320 having any suitable number of any suitable components in any suitable arrangement.

In particular embodiments, processor 322 includes hardware for executing instructions, such as those making up computer program 350. As an example and not by way of limitation, to execute instructions, processor 322 may retrieve (or fetch) the instructions from an internal register, an internal cache, memory 324, or storage device 326; decode and execute the instructions; and then write one or more results to an internal register, an internal cache, memory 324, or storage device 326. In particular embodiments, processor 322 may include one or more internal caches for data, instructions, or addresses. This disclosure contemplates processor 322 including any suitable number of any suitable internal caches, where appropriate. As an example and not by way of limitation, processor 322 may include one or more instruction caches, one or more data caches, and one or more translation lookaside buffers (TLBs). Instructions in the instruction caches may be copies of instructions in memory 324 or storage device 326, and the instruction caches may speed up retrieval of those instructions by processor 322. Data in the data caches may be copies of data in memory 324 or storage device 326 for instructions executing at processor 322 to operate on; the results of previous instructions executed at processor 322 for access by subsequent instructions executing at processor 322 or for writing to memory 324 or storage device 326; or other suitable data. The data caches may speed up read or write operations by processor 322. The TLBs may speed up virtual-address translation for processor 322. In particular embodiments, processor 322 may include one or more internal registers for data, instructions, or addresses. This disclosure contemplates processor 322 including any suitable number of any suitable internal registers, where appropriate. Where appropriate, processor 322 may include one or more arithmetic logic units (ALUs); be a multi-core processor; or include one or more processors 322. Although this disclosure describes and illustrates a particular processor, this disclosure contemplates any suitable processor.

In particular embodiments, memory 324 includes main memory for storing instructions such as computer program 350 for processor 322 to execute, or data such as text 105 for processor 322 to operate on. As an example and not by way of limitation, computer system 320 may load instructions from storage device 326 or another source (e.g., another computing system 320) to memory 324. Processor 322 may then load the instructions from memory 324 to an internal register or internal cache. To execute the instructions, processor 322 may retrieve the instructions from the internal register or internal cache and decode them. During or after execution of the instructions, processor 322 may write one or more results (which may be intermediate or final results) to the internal register or internal cache. Processor 322 may then write one or more of those results to memory 324. In particular embodiments, processor 322 executes only instructions in one or more internal registers or internal caches or in memory 324 (as opposed to storage device 326 or elsewhere) and operates only on data in one or more internal registers or internal caches or in memory 324 (as opposed to storage device 326 or elsewhere). One or more memory buses 334 (which may each include an address bus and a data bus) may couple processor 322 to memory 324. Bus 334 may include one or more memory buses, as described below. In particular embodiments, one or more memory management units (MMUs) reside between processor 322 and memory 324 and facilitate accesses to memory 324 requested by processor 322.

In certain embodiments, instructions executed by processor 322 may reside in one or more computer programs 350. A computer program generally refers to instructions, logic, rules, algorithms, code, tables, or other suitable instructions for performing the described functions and operations. In some embodiments, computer program 350 may be stored in memory 324, storage device 326, or any other location accessible to computing system 320. Where appropriate, a computer program may include one or more computer programs; be unitary or distributed; span multiple locations; span multiple machines; or reside in a cloud.

In particular embodiments, storage device 326 includes mass storage for data or instructions. As an example and not by way of limitation, storage device 326 may include an HDD, a floppy disk drive, flash memory, an optical disc, a magneto-optical disc, magnetic tape, a Universal Serial Bus (USB) drive, a solid-state drive (SSD), or a combination of two or more of these. Storage device 326 may include removable or non-removable (or fixed) media, where appropriate. Storage device 326 may be internal or external to computing system 320, where appropriate. In particular embodiments, storage device 326 is non-volatile, solid-state memory. In particular embodiments, storage device 326 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 326 taking any suitable physical form. Storage device 326 may include one or more storage control units facilitating communication between processor 322 and storage device 326, where appropriate. Where appropriate, storage device 326 may include one or more storage device 326. Although this disclosure describes and illustrates particular storage, this disclosure contemplates any suitable storage.

In particular embodiments, I/O interface 328 includes hardware, software, or both providing one or more interfaces for communication between computing system 320 and one or more I/O devices. System 320 may include one or more of these I/O devices, where appropriate. One or more of these I/O devices may enable communication between a user and computing system 320. As an example and not by way of limitation, an I/O device may include a keyboard, keypad, microphone, monitor, mouse, printer, scanner, speaker, still camera, stylus, tablet, touchscreen, trackball, video camera, sensor, another suitable I/O device or a combination of two or more of these. This disclosure contemplates any suitable I/O devices and any suitable I/O interfaces 328 for them. Where appropriate, I/O interface 328 may include one or more devices or software drivers enabling processor 322 to drive one or more of these I/O devices. I/O interface 328 may include one or more I/O interfaces 328, where appropriate. Although this disclosure describes and illustrates a particular I/O interface 328, this disclosure contemplates any suitable I/O interface 328.

In particular embodiments, communication interface 332 includes hardware, software, or both providing one or more interfaces for communication (e.g., packet-based communication and facsimile communication) between computing system 320 and one or more other computing systems 320. As an example and not by way of limitation, communication interface 332 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 332 for it. As an example and not by way of limitation, computing system 320 may communicate with an ad hoc network, a personal area network (PAN), a local area network (LAN), a wide area network (WAN), a metropolitan area network (MAN), one or more portions of the Internet, a PSTN, or a combination of two or more of these. One or more portions of one or more of these networks may be wired or wireless. As an example, computing system 320 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computing system 320 may include any suitable communication interface 332 for any of these networks, where appropriate. Communication interface 332 may include one or more communication interfaces 31, where appropriate. Although this disclosure describes and illustrates a particular communication interface, this disclosure contemplates any suitable communication interface.

In particular embodiments, bus 334 includes hardware, software, or both coupling components of computing system 320 to each other. As an example and not by way of limitation, bus 334 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 334 may include one or more buses 334, where appropriate. Although this disclosure describes and illustrates a particular bus, this disclosure contemplates any suitable bus or interconnect.

The components of system 320 may be integrated or separated. In some embodiments, components of system 320 may each be housed within a single chassis. The operations of system 320 may be performed by more, fewer, or other components. Additionally, operations of system 320 may be performed using any suitable logic that may comprise software, hardware, other logic, or any suitable combination of the preceding.

[1] Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a SSD, a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

[2] Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A system, comprising:
one or more memory units; and
one or more processing units operable to:
  access text;
  identify a plurality of terms from the text;
  determine a plurality of term vectors associated with the identified plurality of terms;
  calculate a weight of each of the determined plurality of term vectors;
  cluster the determined plurality of term vectors into a plurality of clusters, the plurality of clusters comprising a first cluster related to a first concept of the text and a second cluster related to a second concept of the text, the first concept being distinct from the second concept, the first and second clusters each comprising two or more of the determined term vectors, the clustering comprising grouping two or more of the determined term vectors together based on the determined weights of the two or more term vectors and a distance between the two or more term vectors;
  create a first pseudo-document according to the first cluster;
  create a second pseudo-document according to the second cluster;

identify, using latent semantic analysis (LSA) of the first pseudo-document, a first set of terms associated with the first cluster;

identify, using LSA of the second pseudo-document, a second set of terms associated with the second cluster;

determine a first weight associated with the first cluster and a second weight associated with the second cluster, wherein the first weight is based at least on the determined weights of the term vectors of the first cluster, and wherein the second weight is based at least on the determined weights of the term vectors of the second cluster;

determine a first percentage of a list of output terms that should come from the first cluster and a second percentage of the list of output terms that should come from the second cluster, the first percentage based on a ratio of the first weight to a sum of the first and second weights, the second percentage based on a ratio of the second weight to the sum of the first and second weights;

select one or more terms from the first set of terms according to the determined first percentage;

select one or more terms from the second set of terms according to the determined second percentage;

combine the selected terms from the first and second sets of terms into the list of output terms, the list of output terms having the first and second concepts of the text; and store the list of output terms in the one or more memory units.

2. The system of claim 1, wherein identifying the plurality of terms from the text comprises using a vocabulary driven parser.

3. The system of claim 1, wherein clustering the determined plurality of term vectors into the plurality of clusters comprises using agglomerative clustering.

4. The system of claim 1, wherein combining the selected terms from the first and second sets of terms into the list of output terms comprises using log-entropy mixing.

5. The system of claim 1, wherein:
the one or more processing units are further operable to:
create a query pseudo-document from the determined plurality of term vectors;
create a first leaned pseudo-document using the first pseudo-document and the query pseudo-document; and
create a second leaned pseudo-document using the second pseudo-document and the query pseudo-document;
wherein:
identifying the first set of terms associated with the first cluster comprises using LSA of the first leaned pseudo-document; and
identifying the second set of terms associated with the second cluster comprises using LSA of the second leaned pseudo-document.

6. The system of claim 5, wherein creating the first and second leaned pseudo-documents comprises:
determining a query vector according to the query pseudo-document;
determining a first cluster vector according to the first pseudo-document;
determining a second cluster vector according to the second pseudo-document;
normalizing the query vector and the first cluster vector to the same length;

normalizing the query vector and the second cluster vector to the same length;
determining a first leaned cluster vector that points to a location that is between the query vector and the first cluster vector; and
determining a second leaned cluster vector that points to a location that is between the query vector and the second cluster vector.

7. The system of claim 1, wherein:
the weights of each of the determined plurality of term vectors comprise log-entropy weights;
the first weight associated with the first cluster comprises a sum of the determined log-entropy weights of the term vectors of the first cluster; and
the second weight associated with the second cluster comprises a sum of the determined log-entropy weights of the term vectors of the second cluster.

8. A computer-implemented method, comprising:
accessing text by a processing system;
identifying, by the processing system, a plurality of terms from the text;
determining, by the processing system, a plurality of term vectors associated with the identified terms;
calculating a weight of each of the determined term vectors;
clustering, by the processing system, the determined term vectors into a plurality of clusters, each of the clusters being related to a distinct concept of the text, each cluster comprising at least one of the determined term vectors, the clustering comprising selecting the at least one of the determined term vectors based on the determined weights of the term vectors and distances between the determined term vectors;
creating, by the processing system, a first pseudo-document according to a first cluster of the plurality of clusters and a second pseudo-document according to a second cluster of the plurality of clusters;
identifying, by the processing system using latent semantic analysis (LSA), a first set of terms associated with the first cluster and a second set of terms associated with the second cluster;
determining a first weight associated with the first cluster and a second weight associated with the second cluster, wherein the first weight is based at least on the determined weights of the term vectors of the first cluster, and wherein the second weight is based at least on the determined weights of the term vectors of the second cluster;
determining a first percentage of a list of output terms that should come from the first cluster and a second percentage of the list of output terms that should come from the second cluster, the first percentage based on a ratio of the first weight to a sum of the first and second weights, the second percentage based on a ratio of the second weight to the sum of the first and second weights;
selecting one or more terms from the first set of terms according to the determined first percentage;
selecting one or more terms from the second set of terms according to the determined second percentage;
creating, by the processing system, the list of output terms using at least a portion of the selected terms from the first and second sets of terms, the list of output terms having the distinct concepts of the plurality of clusters; and
storing the list of output terms in one or more memory units.

9. The computer-implemented method of claim 8, wherein identifying the terms from the text comprises using a vocabulary driven parser.

10. The computer-implemented method of claim 8, wherein clustering the determined term vectors into the plurality of clusters comprises using agglomerative clustering.

11. The computer-implemented method of claim 8, wherein creating the list of output terms comprises using log-entropy mixing.

12. The computer-implemented method of claim 8, further comprising:
  creating a query pseudo-document from the determined term vectors; and
  creating a leaned pseudo-document using the first pseudo-documents and the query pseudo-document;
  wherein identifying the first set of terms comprises using LSA of the leaned pseudo-document.

13. The computer-implemented method of claim 12, wherein creating the leaned pseudo-document comprises:
  determining a query vector according to the query pseudo-document;
  determining a cluster vector according to the first pseudo-document;
  normalizing the query vector and the cluster vector to the same length; and
  determining a leaned cluster vector that points to a location that is between the query vector and the cluster vector.

14. The computer-implemented method of claim 8, wherein:
  the weights of each of the determined term vectors comprise log-entropy weights;
  the first weight associated with the first cluster comprises a sum of the determined log-entropy weights of the term vectors of the first cluster; and
  the second weight associated with the second cluster comprises a sum of the determined log-entropy weights of the term vectors of the second cluster.

15. A non-transitory computer-readable medium comprising software, the software when executed by one or more processing units operable to perform operations comprising:
  accessing text;
  identifying a plurality of terms from the text;
  determining a plurality of term vectors associated with the identified plurality of terms;
  calculating a weight of each of the determined plurality of term vectors;
  clustering the determined plurality of term vectors into a plurality of clusters, the plurality of clusters comprising a first cluster related to a first concept of the text and a second cluster related to a second concept of the text, the first concept being distinct from the second concept, the first and second clusters each comprising two or more of the determined term vectors, the clustering comprising grouping two or more of the determined term vectors together based on the determined weights of the two or more term vectors and a distance between the two or more term vectors;
  creating a first pseudo-document according to the first cluster;
  creating a second pseudo-document according to the second cluster;
  identifying, using latent semantic analysis (LSA) of the first pseudo-document, a first set of terms associated with the first cluster;
  identifying, using LSA of the second pseudo-document, a second set of terms associated with the second cluster;
  determining a first weight associated with the first cluster and a second weight associated with the second cluster, wherein the first weight is based at least on the determined weights of the term vectors of the first cluster, and wherein the second weight is based at least on the determined weights of the term vectors of the second cluster;
  determining a first percentage of a list of output terms that should come from the first cluster and a second percentage of the list of output terms that should come from the second cluster, the first percentage based on a ratio of the first weight to a sum of the first and second weights, the second percentage based on a ratio of the second weight to the sum of the first and second weights;
  selecting one or more terms from the first set of terms according to the determined first percentage;
  selecting one or more terms from the second set of terms according to the determined second percentage;
  combining the selected terms from the first and second sets of terms into the list of output terms, the list of output terms having the first and second concepts of the text; and
  storing the list of output terms in one or more memory units.

16. The non-transitory computer-readable medium of claim 15, wherein clustering the determined plurality of term vectors into the plurality of clusters comprises using agglomerative clustering.

17. The non-transitory computer-readable medium of claim 15, wherein combining the selected terms from the first and second sets of terms into the list of output terms comprises using log-entropy mixing.

18. The non-transitory computer-readable medium of claim 15, the one or more processing units further operable to perform operations comprising:
  creating a query pseudo-document from the determined plurality of term vectors;
  creating a first leaned pseudo-document using the first pseudo-document and the query pseudo-document; and
  creating a second leaned pseudo-document using the second pseudo-document and the query pseudo-document; and
  wherein:
    identifying the first set of terms associated with the first cluster comprises using LSA of the first leaned pseudo-document; and
    identifying the second set of terms associated with the second cluster comprises using LSA of the second leaned pseudo-document.

19. The non-transitory computer-readable medium of claim 18, wherein creating the first and second leaned pseudo-documents comprises:
  determining a query vector according to the query pseudo-document;
  determining a first cluster vector according to the first pseudo-document;
  determining a second cluster vector according to the second pseudo-document;
  normalizing the query vector and the first cluster vector to the same length;
  normalizing the query vector and the second cluster vector to the same length;
  determining a first leaned cluster vector that points to a location that is between the query vector and the first cluster vector; and
  determining a second leaned cluster vector that points to a location that is between the query vector and the second cluster vector.

20. The non-transitory computer-readable medium of claim 15, wherein:
  the weights of each of the determined plurality of term vectors comprise log-entropy weights;

the first weight associated with the first cluster comprises a sum of the determined log-entropy weights of the term vectors of the first cluster; and the second weight associated with the second cluster comprises a sum of the determined log-entropy weights of the term vectors of the second cluster.

\* \* \* \* \*